3,825,556
$N^1$-(SUBSTITUTED ETHYL)INDAZOLES

Pasquale P. Minieri, Woodside, N.Y., assignor to Tenneco Chemicals, Inc.
No Drawing. Continuation-in-part of applications Ser. No. 689,812, Dec. 12, 1967, now Patent No. 3,641,050, and Ser. No. 141,999, May 10, 1971, now Patent No. 3,741,979. This application Feb. 7, 1972, Ser. No. 224,294
Int. Cl. C07d 49/18
U.S. Cl. 260—310 C          1 Claim

ABSTRACT OF THE DISCLOSURE

Compounds that have the structural formula

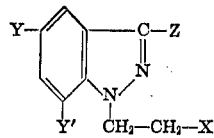

wherein X represents halogen, —SCN, —OR, or —N=R'; Y and Y' each represents hydrogen, halogen, lower alkyl, nitro, amino acoylamino, aroylamino, (halobenzylidene) amino, or —N=R'; Z represents hydrogen, halogen, acoylamino, or —N=R'; R represents hydrogen, alkyl having 1 to 12 carbon atoms, haloalkyl having 1 to 4 carbon atoms, phenyl, or substituted phenyl wherein the substituent is halogen, hydroxyl, alkyl, or nitro; and R' represents an alkylene group having from 1 to 8 carbon atoms, can be used to control the growth of a variety of plant and animal pests. Illustrative of these compounds is $N^1$-(2-hydroxyethyl)-5-nitroindazole.

---

This is a continuation-in-part of copending applications Ser. No. 689,812, which was filed on Dec. 12, 1967, and which is now U.S. Pat. No. 3,641,050, and Ser. No. 141,999, which was filed May 10, 1971, and which is now U.S. Pat. No. 3,741,979.

This invention relates to certain $N^1$-(substituted ethyl)-indazoles and to the use of these compounds in the control of various plant and animal pests.

In accordance with this invention, it has been found that certain $N^1$-(substituted ethyl)indazoles have usual and valuable activity as bactericides, fungicides, insecticides, and herbicides. These compounds may be represented by the structural formula

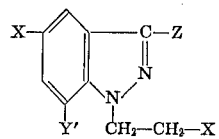

wherein X represents chlorine, bromine, fluorine, iodine, thiocyanato, —OR, or —N=R'; Y and Y' each represents hydrogen, chlorine, bromine, fluorine, iodine, alkyl having 1 to 4 carbon atoms, nitro, amino, acoylamino, aroylamino, (halobenzylidene)-amino, or —N=R'; Z represents hydrogen, chlorine, bromine, fluorine, iodine, acoylamino, or —N=R'; R represents hydrogen, alkyl having 1 to 12 carbon atoms, chloroalkyl having 1 to 4 carbon atoms, bromoalkyl having 1 to 4 carbon atoms, fluoroalkyl having 1 to 4 carbon atoms, iodoalkyl having 1 to 4 carbon atoms, phenyl, chlorophenyl, bromophenyl, fluorophenyl, iodophenyl, hydroxyphenyl, alkylphenyl, or nitrophenyl; and R' represents an alkylene group having from 1 to 8 carbon atoms.

Illustrative of the compounds of this invention are the following:

$N^1$-(2-hydroxyethyl)-3-chloroindazole;
$N^1$-(2-hydroxyethyl)-3-chloro-5-nitroindazole;
$N^1$-(2-hydroxyethyl)-3,5-dibromoindazole;
$N^1$-(2-hydroxyethyl)-5,7-dichloroindazole;
$N^1$-(2-bromoethyl)-5,7-dibromoindazole;
$N^1$-(2-fluoroethyl)-3-methyleneiminoindazole;
$N^1$-(2-iodoethyl)-3-acetaminoindazole;
$N^1$-(2-thiocyanatoethyl)-5-methyleneiminoindazole;
$N^1$-(2-thiocyanatoethyl)-5-mehtyl-7-nitroindazole;
$N^1$-(2-methyleneiminoethyl)-5-acetaminoindazole;
$N^1$-(2-piperidinoethyl)-5-(3,4-dichlorobenzylidene) aminoindazole;
$N^1$-(2-methoxyethyl)-5-ethyleneiminoindazole;
$N^1$-(2-chloroethoxyethyl)-5-piperidinoindazole;
$N^1$-(2-bromobutoxyethyl)indazole;
$N^1$-(2-phenoxyethyl)-5-aminoindazole;
$N^1$-[2-(m-nitrophenoxy)ethyl]-3-chloroindazole;
$N^1$-[2-(p-tert.butylphenoxy)ethyl]-5-methyl-7-chloroindazole;
$N^1$-(2-butoxyethyl)-5-benzaminoindazole;
$N^1$-[2-(o-hydroxyphenoxy)ethyl]-3,5-dichloroindazole; and the like.

The most effective of the novel compounds as pesticides are those in which X represents hydroxyl or halogen; Y and Y' each represents hydrogen, halogen or nitro; and Z represents hydrogen or halogen. The following are examples of these preferred compounds:

$N^1$-(2-hydroxyethyl)indazole;
$N^1$-(2-hydroxyethyl)-3-chloro-5-nitroindazole;
$N^1$-(2-hydroxyethyl)-5,7-dichloroindazole;
$N^1$-(2-hydroxyethyl)-5,7-dibromoindazole;
$N^1$-(2-hydroxyethyl)-3,5,7-trichloroindazole;
$N^1$-(2-chloroethyl)-3-chloroindazole;
$N^1$-(2-chloroethyl)-5-chloroindazole;
$N^1$-(2-bromoethyl)-3,5,7-tribromoindazole;
$N^1$-(2-fluoroethyl)-5,7-difluoroindazole;
$N^1$-(2-chloroethyl)-5,7-dichloroindazole;
$N^1$-(2-iodoethyl)-5,7-diiodoindazole;
$N^1$-(2-chloroethyl)-5-nitroindazole; and
$N^1$-(2-chloroethyl)-3-chloro-5-nitroindazole.

The $N^1$-(substituted ethyl)indazoles of this invention may be prepared by any suitable and convenient procedure. For example, they may be prepared by heating the appropriate substituted indazole with a compound that will react with it to form the desired $N^1$-(substituted ethyl)indazole. Thus, the $N^1$-(2-hydroxyethyl)indazoles may be prepared by heating a substituted indazole with ethylene carbonate. The $N^1$-(2-chloroethyl) compounds are formed by heating the corresponding $N^1$-(2-hydroxyethyl) compounds with thionyl chloride, and the $N^1$-(2-thiocyanatoethyl) compounds are prepared by heating the $N^1$-(2-chloroethyl) compounds with potassium thiocyanate. The reactions are generally carried out in a solvent such as benzene, toluene, xylene, acetone, pyridine, ethanol, or ethylene dichloride, at the reflux temperature of the reaction mixture.

The $N^1$-(substituted ethyl)indazoles can be used to inhibit or prevent the growth of a wide variety of fungi, bacteria, plants, and insects.

In a preferred embodiment of the invention, the $N^1$-(substituted ethyl) indazoles are used as preservatives for aqueous compositions that contain organic material that is ordinarily subject to spoilage resulting from the action of bacteria, such as latex paints, emulsified cutting oils, adhesives, hydraulic fluids, pulp dispersions used in paper making, and cosmetic soaps, creams, and lotions. The addition to such aqueous compositions of as little as 0.10 percent by weight of one or more of the biocidal compounds of this invention will bring about an appreciable improvement in the resistance of the composition to attack by bacteria. Three percent or more of the biocidal compounds can be used, but these larger amounts ordinarily do not provide further improvement in the properties of the compositions and for this reason are not usually used. It is generally preferred to incorporate 0.2 percent to 0.4 percent by weight of the biocidal compounds into aqueous compositions to protect them from attack by bacteria.

The $N^1$-(substituted ethyl)indazoles are of particular value as preservatives for surface-coating compositions that are aqueous dispersions that contain about 10 percent to 60 percent by weight of a water-insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinyl acetate or vinylidene chloride; polyethylene; polyisobutylene; polystyrene; copolymers of styrene with maleic anhydride or butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof. Suitable oleoresinous binders include drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

In another preferred embodiment of this invention, the $N^1$-(substituted ethyl)indazoles are used to impart fungal and bacterial resistance to dried films of protective or decorative coating compositions that have been applied to a surface. When they are added in the amount of about 0.1 percent to about 3 percent, and preferably 0.5 percent to 2 percent, based on the weight of the surface-coating composition, these biocidal compounds, which are thoroughly compatible with the resinous binders that are commonly used in surface-coating compositions and which are resistant to sulfide staining, provide excellent and prolonged resistance to deterioration resulting from attack by fungi, bacteria, and other microorganisms without adversely affecting the color, odor, viscosity, and other physical properties of the surface-coating compositions or of the dried films of these compositions.

Both organic solvent-based and water-based coating systems can be preserved by incorporating into them the biocidal compounds of this invention. These compounds are of particular value as biocides in coatings that contain as their resinous binder an oleoresinous binder and/or a water-insoluble synthetic linear addition polymer as hereinbefore defined.

In addition to the resinous binder and the $N^1$-(substituted ethyl)indazole, the surface-coating compositions of this invention may contain various auxiliary materials, such as pigments, extenders, solvents, dyes, defoaming agents, driers, emulsifying agents, dispersing agents, plasticizers, and the like in the amounts ordinarily used for these purposes.

The compounds of this invention may be incorporated into the surface-coating composition by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone or other solvent.

In other preferred embodiments of the invention, the $N^1$-(substituted ethyl)indazoles are used as agricultural pesticides. They can, for example, be applied to plants or to soil in which plants are growing to control the growth of various plant pathogens without causing visible injury to the plants. They can also be used as insecticides and as selective herbicides.

The invention is further illustrated by the following examples.

EXAMPLE 1

A mixture of 18.1 grams (0.1 mole) of 3-chloroindazole, 7.9 grams (0.127 mole) of ethylene carbonate, and 0.11 gram of anhydrous potassium carbonate was heated at 140°–150° C. for 5 hours and then allowed to stand overnight at room temperature. The solidified reaction mixture was heated in 40 ml. of benzene until it had dissolved, and the resulting solution was cooled and filtered. After washing with benzene and drying, 7.0 grams of $N^1$-(2-hydroxyethyl) - 3 - chloroindazole was obtained. This compound melted at 113°–126° C. and contained 53.69 percent C, 3.66 percent H, and 16.15 percent N (calculated, 55.2 percent C, 4.6 percent H, and 14.2 percent N).

EXAMPLE 2

The procedure described in Example 1 was repeated using 5-chloroindazole in place of 3-chloroindazole. The $N^1$-(2 - hydroxyethyl) - 5 - chloroindazole obtained was an oil that contained 52.8 percent C, 4.5 percent H, 13.9 percent N, and 18.0 percent Cl (calculated, 55.2 percent C, 4.6 percent H, 14.2 percent N, and 18.0 percent Cl).

EXAMPLE 3

The procedure described in Example 1 was repeated using 3-chloro-5-nitroindazole in place of 3-chlorindazole. The $N^1$-(2 - hydroxyethyl)-3-chloro-5-nitroindazole obtained melted at 100°–113° C. and contained 46.2 percent C, 3.8 percent H, 19.1 percent N, and 12.6 percent Cl (calculated, 44.7 percent C, 3.8 percent H, 17.4 percent N, and 14.7 percent Cl).

EXAMPLES 4 AND 5

The following compounds were prepared by the procedure described in Example 1:

| Ex. No. | Compound | Melting point (° C.) | C | H | N | Cl |
|---|---|---|---|---|---|---|
| 4 | $N^1$-(2-hydroxyethyl)-5-nitroindazole. | 97–112 | 52.2 (42.2) | 4.6 (4.3) | 19.7 (21.0) | |
| 5 | $N^1$-(2-hydroxyethyl)-3,5-dichloroindazole. | | 46.1 (46.7) | 2.7 (3.5) | 12.5 (12.1) | 31.5 (30.7) |

Analysis, percent (calculated)

EXAMPLE 6

(A.) A polyvinyl acetate latex paint was prepared by mixing together the following materials:

| | Parts by weight |
|---|---|
| Water | 481.5 |
| 25% aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% aqueous solution of hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| | | |
|---|---|---|
| Viscosity | K.U. | 65 |
| Brookfield viscosity (#4 spindle, 60 r.p.m.) | cps | 800 |
| pH | | 7.8 |
| Yellowness index | | 3.0 |

(B.) An acrylic latex paint was prepared by mixing together the following materials:

| | Parts by weight |
|---|---|
| Water | 168 |
| Alkyl aryl ether surfactant | 6 |
| 25% aqueous solution of sodium salt of maleic anhydride/diisobutylene copolymer | 27 |
| Defoamer | 12 |
| 2% aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | | |
|---|---|---|
| Viscosity | K.U. | 72 |
| Brookfield viscosity (#3 spindle, 60 r.p.m.) | cps | 1250 |
| pH | | 9.2 |
| Yellowness index | | 2.6 |

(C) An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent | 2 |
| Manganese naphthenate (6%) | 2.27 |
| Lead naphthenate (24%) | 11.3 |

EXAMPLE 7

To samples of the paints whose preparation was described in Example 6 were added 2 percent by weight of either one of the compounds of this invention or a comparative biocide, and the treated paints were mixed for 24 hours on a ball mill. The treated paints were evaluated by the following procedure: Pieces of drawdown paper were dipped into the paint, dried for 24 hours, and again dipped into the paint. After a 24-hour drying period, the coated paper samples were cut into 1¼ inch squares. Each of the coated paper squares was placed on a plate of malt and mycophil agar, which had been inoculated with 1 ml. of a suspension of the test organism. The plates, prepared in triplicate, were incubated at 28° C. and observed weekly. The growth was estimated according to the following key, and the results of the triplicate plates were averaged. In the table that follows ZO=Zone of inhibition in mm.
0=No zone of inhibition; no growth
Tr=Trace zone of inhibition
--=Not tested Bacteria:
    A—*Bacillus subtilis*
    B—*Aerobacter aerogenes*
    C—*Pseudomonas aeruginosa*

Fungi:
    D—*Pullularia pullulans*
    E—*Penicillium crustosum*
    F—*Aspergillus niger*

The compounds tested and the results obtained are given in Table I.

TABLE I.—Activity of $N^1$-(2-substituted ethyl)indazoles as Biocides in Paints

| Biocide | Paint | Effect on paint | | Biocidal activity | | | | | |
|---|---|---|---|---|---|---|---|---|---|
| | | pH | Color | Bacteria | | | Fungi | | |
| | | | | A | B | C | D | E | F |
| Product of example 1 | Acrylic | 8.9 | White | 0 | 0 | 0 | 0 | 0 | 0 |
| | PVA | 7.3 | do | 0 | 0 | 0 | Tr | 0 | 0 |
| | Oil | | do | -- | -- | -- | ZO-3 | ZO-6 | ZO-3 |
| Product of example 2 | Acrylic | 9.2 | Off-white | 0 | 0 | 0 | ZO-2 | ZO-1 | 0 |
| | PVA | 7.6 | Beige | 0 | 0 | 0 | ZO-1 | ZO-1 | Tr |
| | Oil | | Off-white | -- | -- | -- | ZO-2 | Tr | ZO-1 |
| Product of example 4 | Acrylic | 9.3 | Beige | Tr | 0 | 0 | 0 | Tr | 0 |
| | PVA | 7.1 | do | Tr | 0 | 0 | 0 | 0 | 0 |
| | Oil | | White | -- | -- | -- | 0 | 0 | 0 |
| Product of example 5 | Acrylic | 8.9 | do | 0 | 0 | 0 | 0 | ZO-3 | 0 |
| | PVA | 7.0 | do | 0 | 0 | 0 | 0 | 0 | 0 |
| | Oil | | do | -- | -- | -- | ZO-1 | ZO-5 | Tr |

EXAMPLE 8

Acetone solutions were prepared by dissolving 100 mg. portions of the products of Examples 1–5 in 10 ml. of acetone that contained 2000 p.p.m. of sorbitan trioleate and 5000 p.p.m. of a polyoxyethylene ether of sorbitan monooleate. The acetone solutions were dispersed in 90 ml. portions of distilled water to form aqueous solutions that contained 1000 p.p.m. of the indazoles. More dilute solutions were prepared by adding distilled water to the solutions.

EXAMPLE 9

Separate lots of sterilized soil were inoculated with plant pathogens. The inoculated soil was placed in 4-ounce containers, and the soil in each container was drenched with 30 ml. of an aqueous solution prepared by the procedure of Example 13. After incubation for two days at 70° F. the amount of mycelial growth on the surface of the soil was noted. The results of these tests are given in Table II. In this table a rating of 1 indicates that the surface of the soil was completely covered with colonies of the organism, 2 indicates that about 75 percent of the surface was covered with colonies of the organism, 3 indicates that about half of the surface was covered with colonies of the organism, 4 indicates that a few scattered colonies were present, and 5 indicates that there was no mycelial growth on the surface of the soil.

TABLE II.—Activity of $N^1$-(2-substituted ethyl)Indazoles as Soil Fungicides

| Biocide | Rate of application (number/acre) | Sclerotium rolfsii | Pythium sp. | Rhizoctonia solani | Fusarium oxysporum |
| --- | --- | --- | --- | --- | --- |
| Product of example 2 | 300 | 5 | 4 | 4 | 2 |
| Product of example 3 | 300 | 2 | 2 | 3 | 2 |
| Product of example 5 | 300 | 4 | 5 | 4 | 4 |

EXAMPLE 10

A solution of $N^1$-(2-hydroxyethyl)-5-chloroindazole prepared by the procedure of Example 8 was applied to seedlings of various plant species, and the results were observed 43 days after this treatment. All of the clover, soybean, sugarbeet, cotton, mustard, buckwheat, crabgrass, and foxtail plants were killed when the solution was applied at the rate of 20 pounds of biocide per acre, but the corn, oat, and ryegrass plants were only slightly affected by this treatment. Application of the biocide at the rate of 10 pounds per acre caused injury to the clover, sugarbeet, morning glory, and crabgrass plants.

EXAMPLE 11

Plants were sprayed until the liquid dripped from the leaves with aqueous solutions prepared by the procedure of Example 8. When the plants had dried, they were sprayed with a suspension of spores of a plant pathogen. Ten days after treatment, the degree of suppression of the disease was noted. In no case was there appreciable injury to the plants. The results obtained are summarized in Table III.

TABLE III.—Activity of $N^1$-(2-substituted ethyl)indazoles as Foliar Fungicides

| Biocide | Rate of application p.p.m. | Late blight of tomatoes | Leaf rust of wheat | Powdery mildew of cucumbers |
| --- | --- | --- | --- | --- |
| Product of example 2 | 1,000 | | 50 | |
| Product of example 3 | 1,000 | 63 | 90 | 50 |
| Product of example 5 | 1,000 | | 80 | 50 |

Each of the other $N^1$-(substituted ethyl)indazoles disclosed herein can be used in a similar way to control the growth of a variety of plant and animal pests.

The terms and expressions which have been employed are used as terms of descrption and not of limitation. There is no intention in the use of such terms and expressions of excluding any equivalents of the features shown and described or portions thereof, but it is recognized that various modifications are possible within the scope of the invention claimed.

What is claimed is:

1. $N^1$-(2-hydroxyethyl)-3-chloro-5-nitroindazole.

References Cited

UNITED STATES PATENTS 3,637,736  1/1972  Minieri _____ 260—310 C

FOREIGN PATENTS 2,003,561  7/1970  Germany _____ 260—310 C
1,568,790  4/1969  France _____ 260—310 C
1,814,335  8/1969  Germany _____ 260—310 C

OTHER REFERENCES

Auwers et al.: Chem. Abst., vol. 22, p. 1156 (1928).

Pozharskii et al.: J. Gen. Chem. (U.S.S.R.), pp. 3409–11 (1964).

NATALIE TROUSOF, Primary Examiner

U.S. Cl. X.R.

71—92; 106—15 R, 15 AF; 260—17 R, 22 R, 23 AC, 23 AR, 23 XA, 23 H, 23 S, 23.7 A, 29.2 R, 29.3, 29.6 XA, 29.6 R, 29.7 R, 29.7 B, 37 R, 45.8 N, 293.6; 424—267, 273